United States Patent
Ohba et al.

(10) Patent No.: US 6,924,846 B2
(45) Date of Patent: Aug. 2, 2005

(54) INFORMATION PROCESSING APPARATUS, GRAPHIC PROCESSING UNIT, GRAPHIC PROCESSING METHOD, STORAGE MEDIUM, AND COMPUTER PROGRAM

(75) Inventors: Akio Ohba, Kanagawa (JP); Masayuki Chatani, Tokyo (JP)

(73) Assignee: Sony Computer Entertainment Inc. (JP)

( * ) Notice: Subject to any disclaimer, the term of this patent is extended or adjusted under 35 U.S.C. 154(b) by 641 days.

(21) Appl. No.: 09/861,916

(22) Filed: May 21, 2001

(65) Prior Publication Data

US 2002/0059648 A1 May 16, 2002

(30) Foreign Application Priority Data

May 22, 2000 (JP) ..................................... P2000-150591
Apr. 27, 2001 (JP) ..................................... P2001-133147

(51) Int. Cl.[7] .......................... H04N 5/445; H04N 9/74
(52) U.S. Cl. ..................... 348/584; 348/51; 348/586; 348/589; 348/563; 348/566; 348/473; 348/474; 345/633
(58) Field of Search .......................... 348/51, 54, 55, 348/584–586, 588–589, 598–600, 563–567, 473–474; 345/633; H04N 5/445, 9/74

(56) References Cited

U.S. PATENT DOCUMENTS

| | | | |
|---|---|---|---|
| 4,888,641 A | | 12/1989 | Isnardi et al. |
| 5,001,555 A | | 3/1991 | Park |
| 5,361,098 A | * | 11/1994 | Lucas ........................ 348/565 |
| 5,386,241 A | * | 1/1995 | Park ........................... 348/565 |
| 5,594,507 A | * | 1/1997 | Hoarty ........................ 348/584 |
| 5,614,952 A | * | 3/1997 | Boyce et al. ........... 375/240.01 |
| 5,847,770 A | * | 12/1998 | Yagasaki .................... 348/563 |
| 5,953,076 A | * | 9/1999 | Astle et al. ................. 348/584 |
| 5,969,767 A | * | 10/1999 | Ishikawa et al. ............ 348/564 |
| 5,995,146 A | * | 11/1999 | Rasmussen ............ 375/240.01 |
| 6,052,648 A | * | 4/2000 | Burfeind et al. ................ 702/3 |
| 6,088,064 A | * | 7/2000 | Rumreich et al. .......... 348/564 |
| 6,166,744 A | * | 12/2000 | Jaszlics et al. .............. 345/629 |
| 6,201,538 B1 | * | 3/2001 | Wugofski .................... 345/716 |
| 6,226,047 B1 | * | 5/2001 | Ryu ........................... 348/569 |
| 6,256,785 B1 | * | 7/2001 | Klappert et al. ............ 725/136 |
| 6,292,225 B1 | * | 9/2001 | Champion et al. .......... 348/511 |
| 6,320,624 B1 | * | 11/2001 | Ayer et al. .................. 348/584 |
| 6,359,657 B1 | * | 3/2002 | Westerink et al. .......... 348/584 |
| 6,473,130 B1 | * | 10/2002 | Kim ........................... 348/565 |
| 6,473,136 B1 | * | 10/2002 | Hasegawa et al. .......... 348/723 |
| 6,556,252 B1 | * | 4/2003 | Kim ........................... 348/565 |
| 6,637,032 B1 | * | 10/2003 | Feinleib ...................... 725/110 |
| 6,657,637 B1 | * | 12/2003 | Inagaki et al. .............. 345/629 |
| 6,697,123 B2 | * | 2/2004 | Janevski et al. ............ 348/565 |
| 6,697,124 B2 | * | 2/2004 | Dimitrova et al. .......... 348/565 |
| 6,707,505 B2 | * | 3/2004 | Kuo et al. ................... 348/584 |

(Continued)

FOREIGN PATENT DOCUMENTS

| | | |
|---|---|---|
| EP | 0 998 151 A2 | 5/2000 |
| WO | WO 94/21086 | 9/1994 |
| WO | WO-98/28906 A2 | 7/1998 |

*Primary Examiner*—Brian P. Yenke
(74) *Attorney, Agent, or Firm*—Lerner, David, Littenberg, Krumholz & Mentlik, LLP

(57) ABSTRACT

An information processing apparatus obtains a first image and display timing information of the first image via a first channel, and a second image via a second channel different from the first channel. The information processing apparatus includes a main CPU for processing the obtained second image in accordance with the contents of the first image, and a CRTC for outputting the obtained first image, the processed second image and the display timing information to a predetermined display unit to display a combined image obtained by combining the first and second images on the display unit.

8 Claims, 6 Drawing Sheets

U.S. PATENT DOCUMENTS

| | | | |
|---|---|---|---|
| 6,721,952 B1 * | 4/2004 | Guedalia et al. | 725/38 |
| 6,724,434 B1 * | 4/2004 | Aaltonen | 348/565 |
| 6,724,436 B1 * | 4/2004 | Saunders et al. | 348/584 |
| 6,741,617 B2 * | 5/2004 | Rosengren et al. | 370/536 |
| 6,758,540 B1 * | 7/2004 | Adolph et al. | 375/240.26 |
| 6,762,798 B1 * | 7/2004 | Messer et al. | 348/565 |
| 6,766,528 B1 * | 7/2004 | Kim et al. | 725/113 |
| 6,784,945 B2 * | 8/2004 | Norsworthy et al. | 348/731 |
| 6,803,968 B1 * | 10/2004 | Numata | 348/584 |
| 6,853,355 B1 * | 2/2005 | Kang et al. | 345/2.2 |
| 2002/0057372 A1 * | 5/2002 | Cavallerano et al. | 348/565 |
| 2002/0069411 A1 * | 6/2002 | Rainville et al. | 725/37 |
| 2003/0016304 A1 * | 1/2003 | Norsworthy et al. | 348/565 |
| 2003/0056215 A1 * | 3/2003 | Kanungo | 725/38 |
| 2004/0107438 A1 * | 6/2004 | Sekiguchi et al. | 725/43 |

* cited by examiner

INFORMATION PROCESSING APPARATUS, GRAPHIC PROCESSING UNIT, GRAPHIC PROCESSING METHOD, STORAGE MEDIUM, AND COMPUTER PROGRAM

BACKGROUND OF THE INVENTION

The present invention relates to a graphic processing technique for adding a new value to a normal broadcast image and more particularly to an information processing technique for implementing such graphic processing.

The broadcasting has been widely performed via ground wave, satellite, and cable and used as an information source which is most readily available. In recent years, the digital broadcasting has been put to practical use in addition to the conventional analog broadcasting. With the practical use of the digital broadcasting, digital broadcasting-compatible television sets are becoming pervasive in addition to the conventional television sets for analog broadcasting.

The receiving facilities include a STB (Set Top Box), which receives information distributed by the digital broadcasting and decodes the received information. The STB implements a decoder that decodes received information using hardware or software. In the case of hardware, an IC designed specifically for decoding is used. In the case of software, a DSP (Digital Signal Processor) designed specifically for programming or a general-purpose CPU (Central Processing Unit) that enhances a function such as a multimedia command is used. The DSP or CPU reads a program to implement a decoding function using software processing.

The DSP or CPU, which implements the decoding function using software, has general versatility and makes it possible to implement functions other than the decoding function concurrently with the decoding function when another program is loaded. Under present circumstances, however, there are few examples that implement efficient functions other than fixed filter processing.

The STB in itself has included a medium such as a hard disk, a multichannel device and the like, with the result that information distributed by a plurality of broadcasts can be received and stored. However, effective use of STB has not been made other than independently using the received information or upgrading software.

SUMMARY OF THE INVENTION

Therefore, it is an object of the present invention to provide a specific configuration in which images inputted from a plurality of routes or channels are combined by effectively using a source such as STB in the receiving facilities so as to provide a combined image to a user, and in particular, to provide implementation of a graphic processing technique for generating an image in which a new value is added to an image distributed by the conventional method.

According to one aspect of the present invention, there is provided an information processing apparatus comprising means for obtaining a first image and display timing information of said first image via a first channel, and a second image via a second channel different from said first channel; first means for processing said obtained second image in accordance with the contents of said first image; and second means for outputting said obtained first image, said second image processed by said first means and said display timing information to a predetermined display unit to display a combined image obtained by combining said first and second images on said display unit.

According to another aspect of the present invention, there is provided an information processing apparatus comprising an information obtaining mechanism for obtaining a first image and display timing information of the first image via a first channel, and a second image via a second channel different from the first channel; a first processor for processing the obtained second image in accordance with the contents of the first image; and a second processor for outputting the obtained first image, the second image processed by the first processor and the display timing information to a predetermined display unit to display a combined image obtained by combining the first and second images on the display unit.

It may be arranged that the first image is a moving image obtained by reducing resolution of a high-resolution moving image to correspond to the first channel, the second image is differential information between the high-resolution moving image and the first image, and the first processor processes the second image such that the combined image having the same resolution as that of the high-resolution moving image is displayed on the display unit.

It may be arranged that the first channel is a radio broadcast channel from a broadcast station, and the second channel is a cable communication channel starting from the broadcast station.

It may be arranged that the first image is one of images for right eye and left eye generated for forming a stereoscopic image, the second image is the other of the images, and the first processor processes the second image such that the stereoscopic image is displayed on the display unit.

It may be arranged that the first image and the second image are images obtained by dividing the same image into two, and the first processor shifts the image that has passed through one of the first channel and the second channel by one to several pixels with respect to the image that has passed through the other channel.

It may be arranged that the first image is a moving image shot by an external unit, the second image is a CG image including an object whose expression of motion is possible, and the first processor synchronizes the motion of the object and an expressional form thereof with a motion of the first image based on the display timing information, and changes the motion of the object and the expressional form in accordance with an execution procedure of a predetermined graphic processing program.

It may be arranged that the information obtaining mechanism obtains additional information indicative of a condition or state of a shooting site in synchronization with the display timing information, and the first processor changes the motion and the expressional form of the object to the contents in which the additional information is reflected.

It may be arranged that the additional information includes relative position information of a location where a character or an object appearing on the moving image is present, and the first processor changes a direction and a display position of the object in accordance with the relative position information.

It may be arranged that the additional information further includes meteorological condition information of the location, and the first processor changes the motion and the expressional form of the object in accordance with the meteorological condition information.

It may be arranged that the apparatus further comprises an input mechanism for receiving an input of operation information indicative of an operation content of a predetermined controller operated by an operator, wherein the first processor changes the motion and the expressional form of the object in accordance with the received operation information.

According to another aspect of the present invention, there is provided a graphic processing device for use in an information processing apparatus comprising an information obtaining mechanism for obtaining a first image and display timing information of the first image via a first channel, and a second image via a second channel different from the first channel, and a processor for displaying a combined image obtained by combining the first and second images on a predetermined display unit, wherein the graphic processing devices processes the second image obtained by the information obtaining mechanism in accordance with the contents of the first image, and the second image processed is sent to the processor as an image forming a part of the combined image.

According to another aspect of the present invention, there is provided a graphic processing method in a computer having a function of displaying images obtained through a plurality of channels on a predetermined display unit, the graphic processing method comprising: obtaining a first image and display timing information of the first image via broadcasting, and a second image obtained by graphic processing regardless of the first image via a channel independent of the broadcasting; processing the obtained second image in accordance with the contents of the first image; and displaying a combined image in which the first image and the processed second image are synchronized with each other, on the display unit based on the obtained display timing information.

According to another aspect of the present invention, there is provided a computer-readable storage medium storing a program, the program causing a computer for displaying images obtained through a plurality of channels on a predetermined display unit, to execute processes of: obtaining a first image and display timing information of the first image via a first channel, and a second image via a second channel different from the first channel; processing the obtained second image in accordance with the contents of the first image; and outputting the obtained first image, the processed second image and the display timing information to the display unit to display a combined image obtained by combining the first and second images on the display unit.

According to another aspect of the present invention, there is provided a computer program for causing a computer for displaying images obtained through a plurality of channels on a predetermined display unit, to execute processes of: obtaining a first image and display timing information of the first image via a first channel, and a second image via a second channel different from the first channel; processing the obtained second image in accordance with the contents of the first image; and outputting the obtained first image, the processed second image and the display timing information to the display unit to display a combined image obtained by combing the first and second images on the display unit.

BRIEF DESCRIPTION OF THE DRAWINGS

These objects and other objects and advantages of the present invention will become more apparent upon reading of the following detailed description and the accompanying drawings in which:

FIGS. 2A and 2B are diagrams for explaining an image combination performed by a CPU, wherein FIG. 2A is a flowchart, and FIG. 2B is a circuit diagram of the main part;

FIGS. 3A and 3B are diagrams for explaining an image combination performed by a GPU, wherein FIG. 3A is a flowchart, and FIG. 3B is a circuit diagram of the main part;

FIGS. 4A and 4B are diagrams for explaining an image with high resolution, wherein FIG. 4A shows the process of generating image information from an image with high resolution and FIG. 4B shows the process of generating an image with high resolution from received image information;

FIGS. 6A and 6B are diagrams for explaining an image obtained by superimposing a game image on a broadcast image, wherein FIG. 6A is a diagram illustrating the case in which the broadcast image and the game image are not related to each other, and FIG. 6B is a diagram illustrating the case in which the broadcast image and the game image are related to each other.

DETAILED DESCRIPTION OF THE PREFERRED EMBODIMENTS

Embodiments of the present invention will be specifically described with reference to drawings accompanying herewith.

Figure 1:
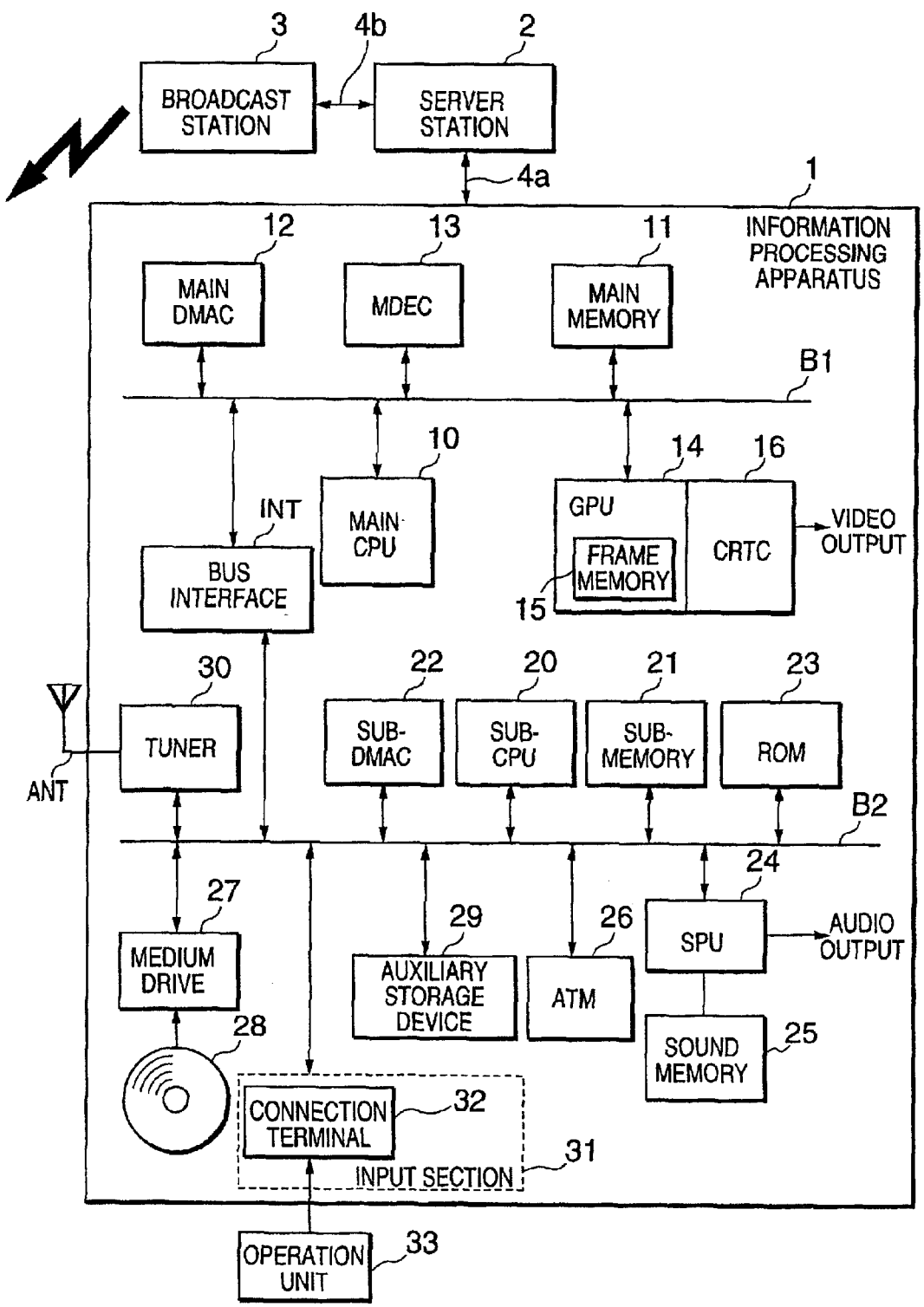
FIG. 1 is a diagram showing an information presenting system.

FIG. 1 shows an overall configuration for carrying out the present invention. An information processing apparatus 1 of the present invention and a server station 2 are connected to a network 4a, so that intercommunication can be performed therebetween. The server station 2 and a broadcast station 3 are connected to a network 4b, so that intercommunication can be performed therebetween.

The server station 2 transmits/receives information to/from the information processing apparatus 1 via the network 4a or transmits information to a plurality of information processing apparatus 1 simultaneously.

The broadcast station 3 has general broadcast facilities that distribute information to the information processing apparatus 1 via broadcasting. Any type of broadcast such as cable broadcast, ground-based broadcast or satellite broadcast may be used as long as it can distribute information to the plurality of information processing apparatus 1 simultaneously. The server station 2 and the broadcast station 3 are connected via the network 4b to enable intercommunication therebetween, so that the stations 2 and 3 can cooperatively supply information to the information processing apparatus 1.

The information processing apparatus 1 to be explained in this embodiment is an entertainment apparatus having two buses, namely, a main bus B1 and a sub-bus B2. These buses B1 and B2 are connected to each other via a bus interface INT or disconnected from each other.

A main CPU 10, a main memory 11 made up of a RAM, a main DMAC (Direct Memory Access Controller) 12, a MPEG (Moving Picture Experts Group) decoder (MDEC) 13, and a graphic processing unit (hereinafter referred to as "GPU") 14 having frame memory 15 incorporated therein are connected to the main bus B1. A CRTC (CRT controller) 16, which is a controller for generating a video output signal, is connected to the GPU 14. An image is displayed on a given display unit, which is connected to the information processing apparatus 1 by a cable or the like, using the video output signal.

At the time of starting the information processing apparatus 1, the main CPU 10 reads a boot program from a ROM 23 on the sub-bus B2 via the bus interface INT, and executes the boot program to run an operating system. The main CPU 10 also controls a medium drive 27, reads an application program and data from a medium 28 loaded into the medium drive 27, and stores them in the main memory 11. Moreover, the main CPU 10 performs geometry processing of three-dimensional object data (e.g. coordinate values of vertexes (representative points) of polygons) composed of various data, e.g., a plurality of polygons, read from the medium 28. As a result of the geometry processing, the main CPU 10 generates a display list including polygon definition information as its contents. Furthermore, the main CPU 10 expands data compressed by MPEG (Moving Picture Experts Group) or JPEG (Joint Photograph Experts Group). Namely, the main CPU 10 has an information decoding function of decoding information using software.

The polygon definition information is composed of drawing area setting information and polygon information. The drawing area setting information is composed of offset coordinates at a frame buffer address of a drawing area and coordinates of a drawing clipping area for canceling the drawing when polygon coordinates are located outside the drawing area. The polygon information is composed of polygon attribute information and vertex information. The polygon attribute information is information for specifying shading mode, a blending mode, texture mapping mode and like. The vertex information is information about vertex inner-drawing area coordinates, vertex inner-texture area coordinates, vertex color and the like.

The GPU 14 holds drawing contexts. The GPU 14 reads the corresponding drawing context based on identification information of an image context included in the display list sent from the main CPU 10 and performs rendering processing using the read drawing context, and draws a polygon in the frame memory 15. Since the frame memory 15 can also be used as a texture memory, a pixel image on the frame memory 15 can be adhered onto the drawing polygon as a texture.

The main DMAC 12 performs a DMA transfer control with respect to the circuits connected to the main bus B1. The main DMAC 12 also performs a DMA transfer control with respect to the circuits connected to the sub-bus B2 in accordance with the state of the bus interface INT.

The MDEC 13 operates in parallel with the main CPU 10 and expands data compressed by MPEG or JPEG. Namely, the MDEC 13 is an information decoder that receives information obtained by a tuner 30, an ATM 26 or the medium drive 27 and decodes it. The MDEC 13 can be implemented by software processing using the IC designed specifically for decoding or the DSP designed specifically for programming. The MDEC 13 may be implemented in the main CPU 10 or a sub-CPU 20 by software processing.

To the sub-bus B2 are connected the CPU 20 composed of a microprocessor or the like, a sub-memory 21 composed of a RAM, a sub-DMAC 22, the ROM 23 storing programs such as an operating system and the like, a sound processing unit (SPU) 24 that reads sound data stored in a sound memory 25 and outputs it as an audio output, the communication controlling section (ATM) 26 that transmits/receives information to/from an external unit such as the server station 2 or the like via the network 4a, the medium drive 27 for loading the medium 28, an auxiliary storage device 29 for storing a large capacity of information, the tuner 30 and an input section 31. The medium 28 is a storage medium such as a CD-ROM or DVD-ROM storing a program for graphic processing. The information processing apparatus 1 reads the program for graphic processing and executes it, thereby to execute predetermined entertainment processing.

The sub-CPU 20 performs various kinds of operations in accordance with the program stored in the ROM 23. The sub-DMAC 22 performs a DMA transfer control with respect to the circuits connected to the sub-bus B2 only when the bus interface INT detaches the main bus B1 from the sub-bus B2.

The tuner 30 extracts information of a channel selected by an operator from information which is sent from the broadcast station 3 and received via an antenna ATN. The input section 31 has a connection terminal 32 through which an input signal is inputted from an operation unit 33. The auxiliary storage device 29 is a normal hard disk that temporarily stores information which is sent from the server station 2 and received by the ATM 26, and information which is sent from the broadcast station 3 and received by the tuner 30.

Though the tuner 30 is provided in the information processing apparatus 1 according to this embodiment, the tuner is not normally provided in the information processing apparatus such as a general purpose computer apparatus. For this reason, the tuner may be added to the information processing apparatus 1 externally, so that information received by the tuner is sent to the information processing apparatus 1. In this case, the information processing apparatus 1 may have an input terminal through which information from the tuner is inputted to the input section 31.

In the aforementioned information processing apparatus 1, there are available three information input channels, namely, a channel for receiving information from the server station 2 via the network 4a by the ATM 26, a channel for receiving the broadcast from the broadcast station 3 via the antenna ANT by the tuner 30 and a channel for obtaining information which is reproduced from the medium 28 by the medium drive 27. These input channels are independent of each other, so that they can receive information from the sever station 2 while the broadcast is being received, and further read information reproduced from the medium 28. Each of the ATM 26, tuner 30, and medium drive 27 is an example of an information obtaining mechanism.

Information captured into the information processing apparatus 1 by the foregoing input channels includes image information serving as a video output generated by the CRTC 16 in addition to voice information serving as an audio output generated by the SPU 24. The image information includes moving image information which is consecutively reproduced to form a moving image, and frame number information indicative of a frame number of each of frame images that form the moving image. The frame number information is one example of display timing information. Aside from this, a vertical synchronizing signal, a horizontal synchronizing signal and the like can be used as display timing information.

An explanation will be given of image combination processing, which is one of the features of the present invention. This processing is performed by the main CPU 10 and GPU 14. FIGS. 2A, 2B, 3A and 3B are diagrams for explaining the image combination.

Figure 2A:
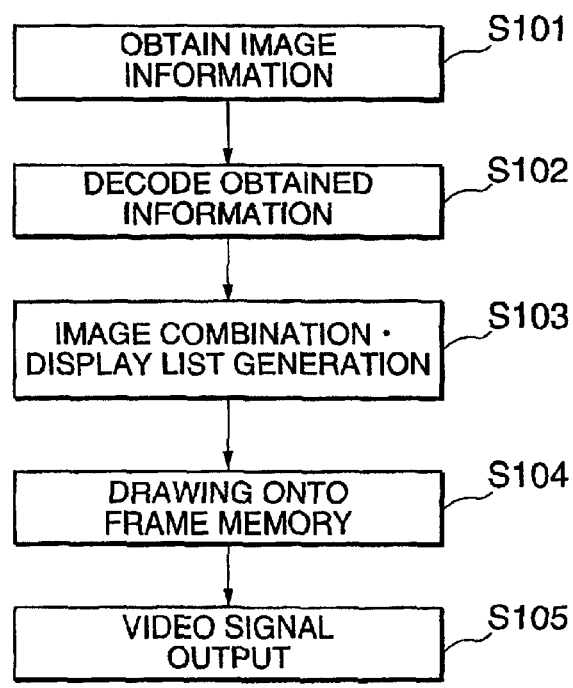
Figure 2B:
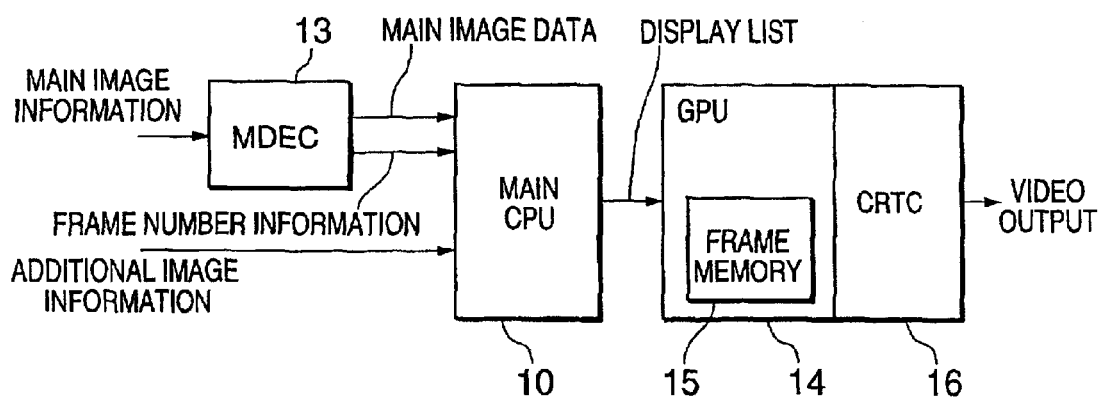

FIGS. 2A and 2B are diagrams for explaining an image combination performed by the main CPU 10, wherein FIG. 2A is a flowchart and FIG. 2B is a circuit diagram of the main part.

When the image combination is performed by the main CPU 10, information including image information is obtained by any two of three channels, namely, the ATM 26, tuner 30 and medium drive 27 serving as an information obtaining mechanism (step S101). The obtained information is information including a main image (hereinafter referred to as "main image information") and information including an additional image (hereinafter referred to as "additional image information"). The main image information is decoded by the MDEC 13. As a result of decoding, a main image is generated. The MDEC 13 not only generates the main image but also reads frame number information indicative of the progress of the main image. The main image generated by the MDEC 13 and the frame number information read thereby are sent to the main CPU 10. The additional image information is decoded by software processing at the main CPU 10 to form an additional image (step S102). At this time, the additional image is processed in accordance with the contents of the main image.

The main CPU 10 superimposes the main image sent from the MDEC 13 and the additional image decoded by the main CPU 10 on each other based on the frame number information to combine the two images, and generates a display list based on the combined image (step S103). The generated display list is sent to the GPU 14 by which the display list is drawn on the frame memory 15 (step S104). The image drawn on the frame memory 15 is sent to the CRTC 16 via the GPU 14 by which the image is converted into a video output signal and outputted as a video output (step S105). The combined image is displayed on a predetermined display unit by the video output signal.

Figure 3A:
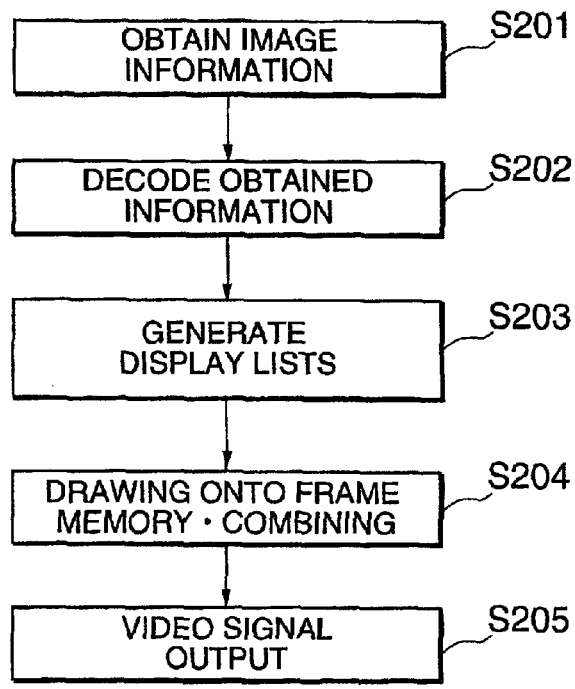
Figure 3B:
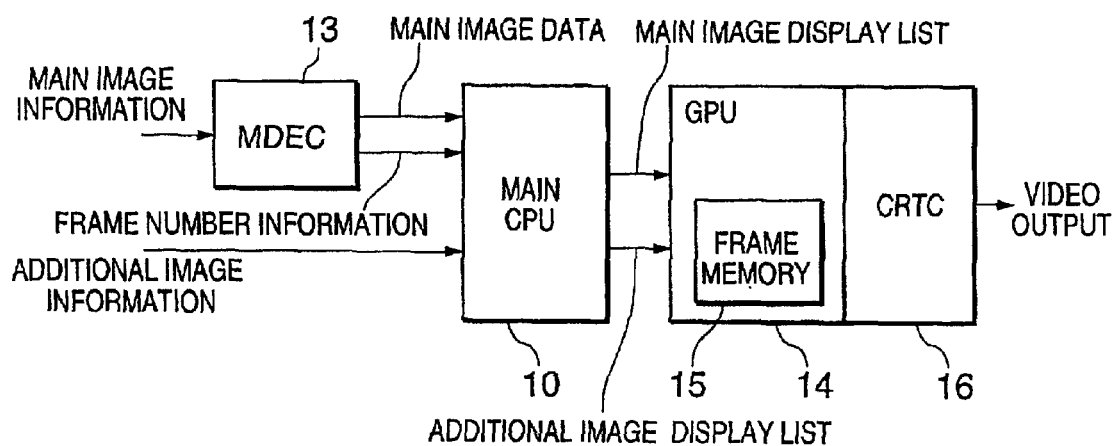

FIGS. 3A and 3B are diagrams for explaining an image combination performed by the GPU 14, wherein FIG. 3A is a flowchart, and FIG. 3B is a circuit diagram of the main part.

When the image combination is performed by the GPU 14, information including image information is obtained by any two of three channels, namely, the ATM 26, tuner 30 and medium drive 27 serving as an information obtaining mechanism (step S201). The obtained information includes main image information and additional image information. The main image information is decoded by the MDEC 13. As a result of decoding, a main image is generated. The MDEC 13 not only generates the main image but also reads frame number information indicative of the progress of the main image. The main image generated by the MDEC 13 and the frame number information read thereby are sent to the main CPU 10.

The additional image information is decoded by software processing at the main CPU 10 to form an additional image (step S202). At this time, the additional image is processed in accordance with the contents of the main image. The main CPU 10 generates a main image display list based on the main image sent from the MDEC 13 and an additional image display list based on the additional image decoded by the main CPU 10 and sends them to the GPU 14 along with the frame number information (step S203).

The GPU 14 combines the main image display list and the additional image display list and draws the display lists on the frame memory 15 (step S204).

There are two methods to perform the image combination using the GPU 14. One is that the combination is performed at the time of drawing the display lists on the frame memory 15. The other is that the combination is performed after drawing the display lists on the frame memory 15.

In the former, the main image display list and the additional image display list are superimposed on each other based on frame number information and drawn in the same area of the frame memory 15. In the latter, the main image display list and the additional image display list are drawn in different areas of the frame memory 15. Thereafter, the GPU 14 reads two drawn images from the frame memory 15 concurrently based on the frame number information, and combines them.

The drawn image thus combined is sent to the CRTC 16 by which the image is converted to a video output signal and outputted as a video output signal (step S205). The combined image is displayed on a predetermined display unit by the video output signal.

When the image combination is performed by either of two units, namely, the main CPU 10 and GPU 14, any one of two images to be combined is temporarily stored in the auxiliary storage device 29, making it possible to obtain image information from the same input channel. In other words, image information previously obtained is temporarily stored in the auxiliary storage device 29, and then different image information is obtained from the same input channel later. The auxiliary storage device 29 may directly store image information previously obtained, or store it after decoding. Image information stored in the auxiliary storage device 29 may be read as required.

EXAMPLES

The information processing apparatus that performs the foregoing image combination processing can generate the following images.

Example 1

Figure 4A:
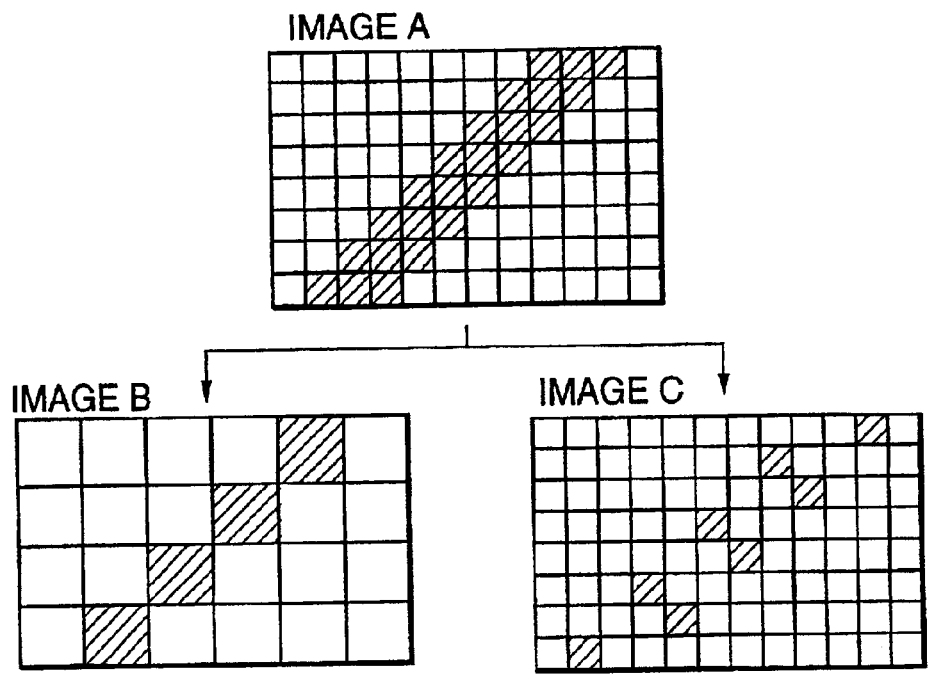
Figure 4B:
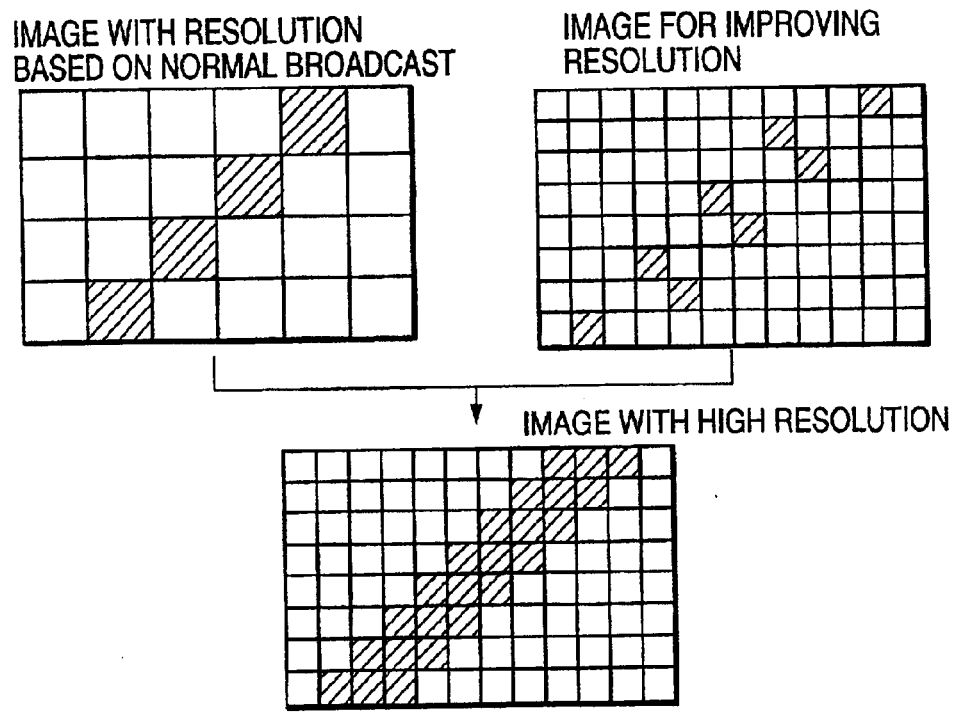

First, an example will be given of the case in which information is received by two input channels and images generated from the received information are superimposed on each other so as to provide a moving image with higher resolution. FIG. 4A illustrates the process of generating image information from an image with high resolution (a frame image which is part of the moving image) and FIG. 4B illustrates the process of generating an image with high resolution from received image information. This image represents "/".

The following will explain an example in which an image with resolution sent by the normal broadcast, and an image for increasing resolution are superimposed on each other. It is assumed that information, serving as an image with resolution based on the normal broadcast, is main image information and that information, serving as an image for increasing resolution, is additional image information. The main image information has moving image information, serving as an image, and frame number information for each of frame images that form the moving image. The main image is a moving image that is obtained by reducing the resolution of the moving image with high resolution such as an image shot for high definition to one for radio broadcast from the broadcast station 3. The additional image information is image information for increasing the resolution of the image based on the main image information. Namely, the additional image information corresponds to image information serving as an image C illustrated in FIG. 4A. The image C is an image corresponding to a difference between an image A obtained by high-resolution shooting and an image B obtained by reducing the resolution of the image A to the resolution for the normal broadcast. The image B of FIG. 4A corresponds to an image with resolution based on the normal broadcast illustrated in FIG. 4B. The image C of FIG. 4A corresponds to an image for increasing resolution illustrated in FIG. 4B.

In this example, it is assumed that the main image information is broadcast from the broadcast station 3 and that the additional image information is transmitted from the server station 2. It is further assumed that the image combination is performed by the main CPU 10.

The main image information is broadcast from the broadcast station 3 and inputted to the tuner 30 via the antenna ANT. The tuner 30 extracts only information of the selected channel and sends it to the MDEC 13. The MDEC 13 decodes the received information to generate a main image, and sends it to the main CPU 10. The MDEC 13 also extracts frame number information from the main image information sent from the tuner 30. The extracted frame number information is also sent to the main CPU 10.

The additional image information represents a difference between the image A and the image B. For this reason, additional image information is normally generated by the broadcast station 3 and sent to the server station 2. Then, the additional image information is inputted to the ATM 26 from the server station 2 via the network 4a. The inputted additional image information is decoded by the main CPU 10. The main CPU 10 generates an additional image.

The main CPU 10 combines the main image sent from the MDEC 13 and the additional image decoded by the main CPU 10, and generates a display list. The combination is performed in synchronization with frame number information such that completely different screen pages are not combined.

The display list generated by the main CPU 10 is sent to the GPU 14, and is drawn on the frame memory 15. Thereafter, the drawn image is sent to the CRTC 16, and converted to a video output signal. By displaying this video output signal on a predetermined display unit, an image with high resolution is obtained.

The generation of image in this way makes it possible to display an image with resolution, which is based on the conventional broadcast, as an image with high resolution. Accordingly, the high-quality broadcast can be implemented by using the conventional broadcast facilities.

Example 2

Figure 5:
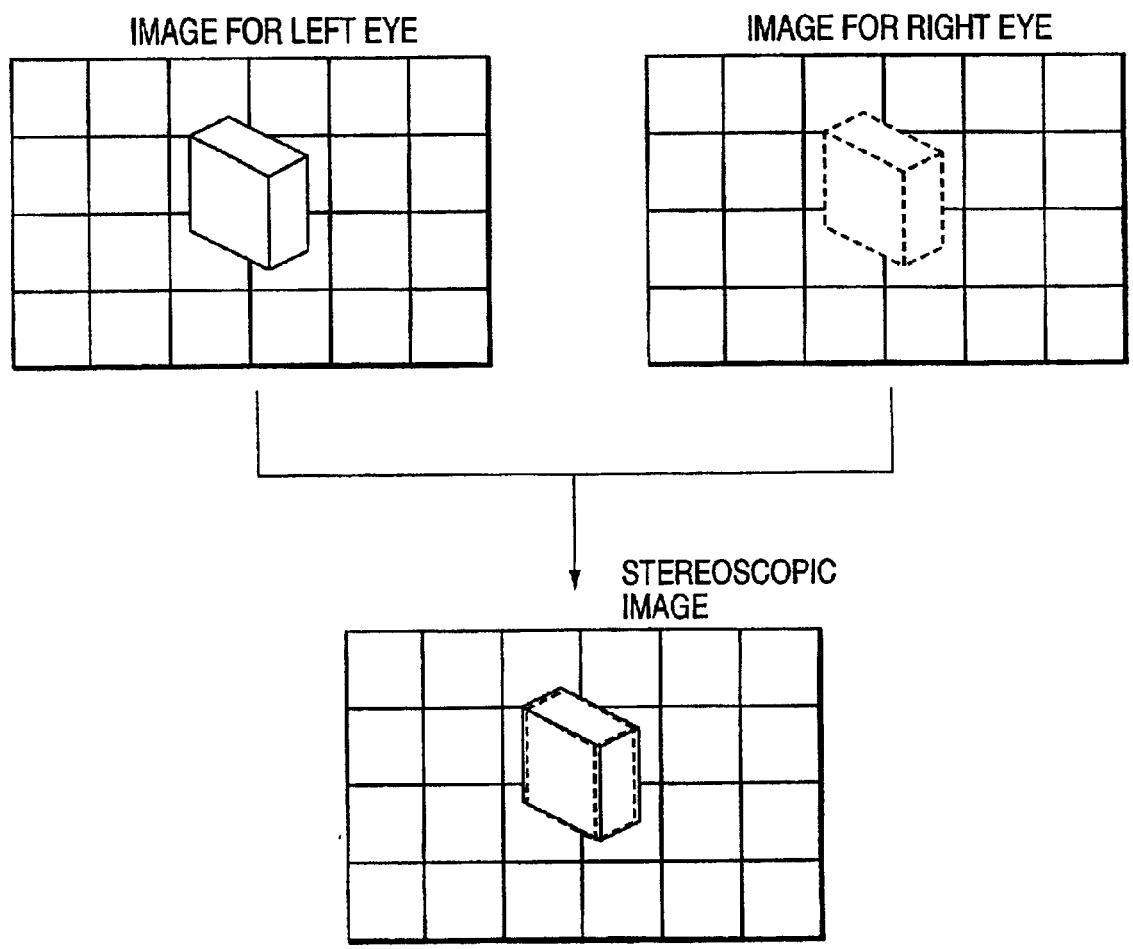
FIG. 5 is a diagram for explaining a stereoscopic image.

Next, an example will be given of the case in which information is received from two input channels and images generated based on the received information are superimposed on each other so as to provide a stereoscopic image as a visually three-dimensional image. FIG. 5 is an example illustrating a stereoscopic image thus generated. The image represents a rectangular parallelepiped.

This figure shows an example in which an image for right eye and an image for left eye are superimposed on each other. It is assumed that information serving as an image for left eye is main image information and that information serving as an image for right eye is additional image information. The main image information has moving image information, serving as an image for left eye, and frame number information for each of frame images that form the moving image. The images for left and right eyes are generated when two cameras one for left eye and the other for right eye shoot the same object with a given distance.

In this example, it is assumed that the main image information is transmitted from the server station 2 and that the additional image information is read from the medium 28. It is further assumed that the image combination is performed by the GPU 14.

The main image information is inputted to the ATM 26 from the server station 2 via the network 4a. The inputted main image information is decoded by the MDEC 13 to serve as a main image. The MDEC 13 also extracts frame number information from the main image information. The main image is sent to the main CPU 10 to serve as a main image display list. The frame number information is sent to the GPU 14 via the main CPU 10.

The additional image information is read from the medium 28 by the medium drive 27. The read information is decoded by the main CPU 10 to serve as an additional image display list. The main image display list and additional image display list are sent to the GPU 14.

The main image display list and the additional image display list sent to the GPU 14 are drawn in the same area of the frame memory 15 to be superimposed on each other in synchronization with the frame number information. Thus, these image display lists are drawn in the same area to be superimposed on each other, so that the image for left eye as a main image and the image for right eye as an additional image are combined.

Thereafter, the drawn image on the frame memory 15 is sent to the CRTC 16 and converted to a video output signal. This video output signal is displayed on a predetermined display unit, so that a stereoscopic image is obtained.

The generation of image in this way makes it possible to display a conventional monaural image as a stereoscopic image.

In addition to this, the stereoscopic image can be implemented by dividing the same image into two, namely, a main image and an additional image. More specifically, if the main CPU 10 generates a display list in such a way that one image is shifted by one to several pixels with respect to the other image, a stereoscopic image is formed when both images are combined.

Example 3

Figure 6A:
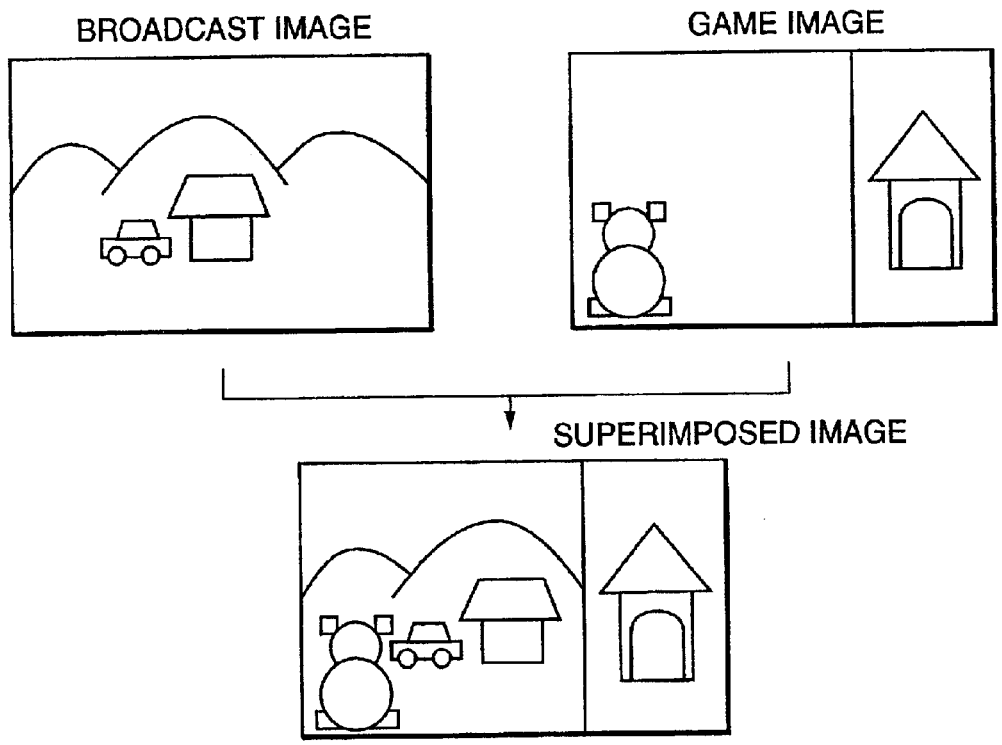
Figure 6B:
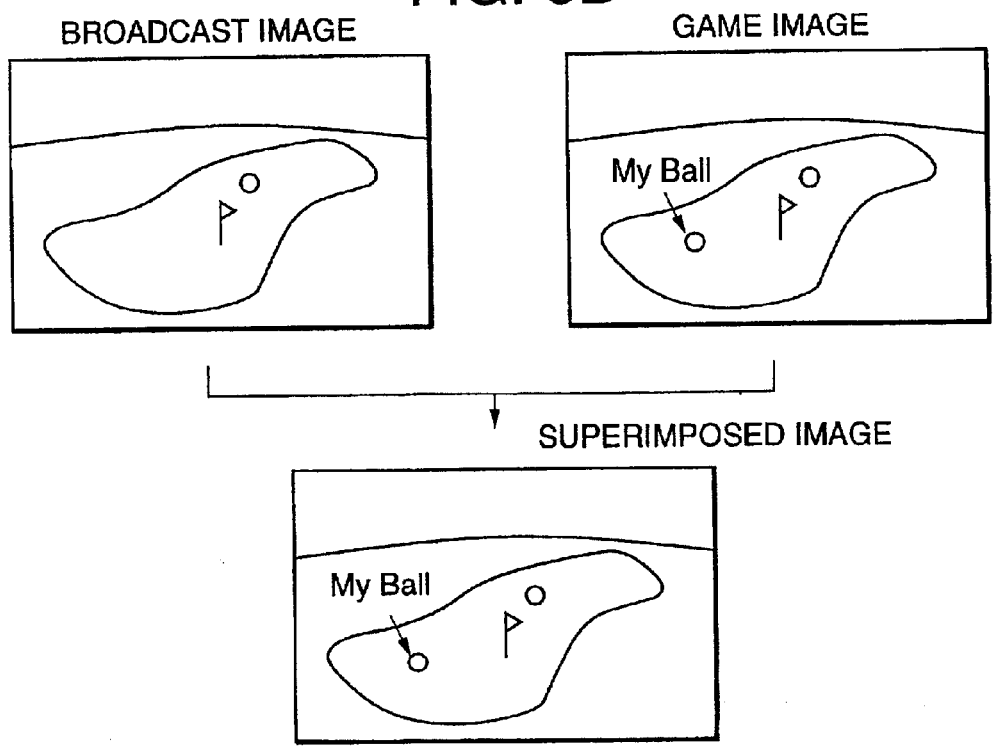

Next, an example will be given of the case in which information is received from two input channels and images generated based on the received information are superimposed on each other so as to provide an image in which a CG image (game image or the like) including an object hose expression of motion is possible is superimposed on a broadcast image. FIGS. 6A and 6B are examples of images thus generated.

In this case, a game image to be superimposed is not necessarily related to a broadcast image. FIG. 6A illustrates an image displayed by superimposing a game image irrelevant to a broadcast image on the broadcast image, namely, by superimposing an image of a rearing game on a broadcast image. FIG. 6B illustrates an image displayed by superimposing a game image relevant to a broadcast image on the broadcast image, namely, by superimposing an image of a golf game on a broadcast golf image. It is assumed that information serving as a broadcast image is main image information and that information serving as a game image is additional image information.

The main image information has moving image information serving as an image, and frame number information for each of frame images that form the moving image. The main image information also includes additional information indicative of the condition or state of a location displayed by the main image. For example, the additional information includes relative position information about a location where a character or an object appearing on the main image is present (information about a position and a size of a mountain, a house, a car in the case of FIG. 6A and information about a name of golf course and a hole number in the case of FIG. 6B) and meteorological condition information at a location displayed by the main image (information about weather, direction of the wind and like in the case of FIG. 6B).

In this example, it is assumed that the main image information is broadcast from the broadcast station 3 and that the additional image information is read from the medium 28. It is further assumed that the image combination is performed by the GPU 14.

The main image information is broadcast from the broadcast station 3 and inputted into the turner 30 via the antenna ANT. The tuner 30 extracts only information of the selected channel and sends it to the MDEC 13. The MDEC 13 decodes the received information to generate a main image, and sends it to the main CPU 10. The main image sent to the main CPU 10 becomes a main image display list. The MDEC 13 also extracts frame number information from the main image information sent from the tuner 30. The extracted frame number information is sent to the GPU 14 via the main CPU 10. Moreover, the additional information is extracted and sent to the main CPU 10.

The additional image information is read from the medium 28 by the medium drive 27. The read information is decoded by the main CPU 10 to form an additional image display list. The main image display list and the additional image display list are sent to the GPU 14. The main CPU 10 synchronizes the motion of the object and the expressional form thereof with the motion of the main image based on the frame number information sent from the MDEC 13, and changes them in accordance with a game program execution order.

Since the additional image display list is a display list that shows a game image, a signal inputted from the operation unit 33 is reflected thereon. More specifically, the input signal from the operation unit 33 is inputted to the main CPU 10 via the input section 31. The main CPU 10 analyzes the input signal and reflects the analytical result on the three-dimensional object to perform geometry processing, whereby generating an additional image display list in which changes are made to the motion of the object and the expressional form thereof.

The main CPU 10 obtains relative position information about what is present on the screen and where it is located on the screen, from the additional information. Then, the main CPU 10 performs processing so that influence is exerted on the motion of the object (a rearing pet in FIG. 6A and a ball in FIG. 6B) and the expressional form thereof based on the obtained relative position information.

For example, in the image of FIG. 6A, it is supposed that a car is moving. The pet confirms coordinates of the car based on the additional information indicative of the position of the car and chases the coordinates. Resultantly, on the screen, there can be obtained an image in which the pet chases the car. The pet has information in which the pet has chased the car, causing the pet to have an interest in the car. Such information is generated as information of the pet so as to improve the rearing of the pet.

In FIG. 6B, information about the name of golf course in the obtained main image and the hole number thereof can be confirmed from the additional information. A game image serving as the corresponding image is generated based on such information.

This makes it possible for the operator to enjoy the game on the generated game image using the operation unit 33. At the time of changing the motion of the object and the expressional form thereof using the operation unit 33, it is possible to provide the motion of the object and the expressional form thereof with consideration given to meteorological condition information obtained from the additional information. For example, if it is raining in the main image, the object in the game image may be displayed as getting wet in the rain. This makes it possible for the operator to experience virtual reality as if the operator played golf under the same condition as the actual golf player in the image. In this manner, the additional information and the operation performed by the operation unit 33 are reflected on the additional image.

The main image display list and the additional image display list sent to the GPU 14 are drawn on different areas of the frame memory 15. Thereafter, the GPU 14 reads two drawn images from the frame memory 15 based on the frame number information concurrently and combines them. The combined image is sent to the CRTC 16 where it is converted to a video output signal and outputted.

Thus, the combined image is generated with consideration given to the additional information and the input signal from the operation unit 33. This makes it possible to exert influence, which is based on the main image, onto the pet to be reared in the rearing game. This also makes it possible to obtain feeling as if the operator played golf with the actual golf player on the image concurrently at the same course under the same condition.

Accordingly, in the aforementioned embodiments, information to be used as images to be superimposed may be obtained from any two of three channels. Additionally, the auxiliary storage device 29 may be provided such that information is obtained from the same channel and information previously obtained is stored in the auxiliary storage device 29 and is read in synchronization with information obtained later.

In the aforementioned embodiments, the present invention is applied to the entertainment apparatus having the structure described above. However, the present invention is not limited thereto. For example, a general-purpose computer loading an operating system to have a function of displaying images obtained from a plurality of channels on a given display unit, may be used for executing a computer program for graphic processing recorded on a storage medium such as a CD-ROM or DVD-ROM so as to perform the graphic processing.

What is claimed is:

1. An information processing apparatus comprising:
means for obtaining a first image and display timing information of said first image via a first channel, and for obtaining a second image via a second channel, said first image being a moving image obtained by reducing resolution of a high-resolution moving image to correspond to said first channel, said second image including differential information representing a difference between said high-resolution moving image and said first image, wherein said first channel is selected from the group consisting of a) a broadcast channel carrying a broadcast signal of a broadcast station transmitted via radio frequency, b) a cable communication channel carrying a cable signal of said broadcast station transmitted via a cable, and c) a recorded source of information recorded on a portable storage medium, and said second channel is selected from the group consisting of said broadcast channel, said cable communication channel and said recorded information source, said second channel being different from said first channel;

means for combining said first image with said second image to produce a unitary merged image timed according to said display timing information, said unitary merged image having the same resolution as that of said high-resolution moving image; and means for outputting said unitary merged image in a form permitting said unitary merged image to be displayed on a display unit.

2. A graphic processing device for use in an information processing apparatus, comprising:

an information obtaining mechanism operable to obtain a first image and display timing information of said first image via a first channel, and to obtain a second image via a second channel, said first image including one of an image for a right eye and an image for a left eye, said second image being the other of said image for the right eye and said image for the left eye, said first and second images being generated for forming a stereoscopic image wherein said first channel is selected from the group consisting of a) a broadcast channel carrying a broadcast signal of a broadcast station; b) a cable communication channel carrying a cable signal of said broadcast station transmitted via a cable, and c) a recorded source of information recorded on a portable storage medium, and said second channel is selected from the group consisting of said broadcast channel, said cable communication channel and said recorded information source, said second channel being different from said first channel; and a processor operable to process said second image obtained by said information obtaining mechanism in accordance with contents of said first image to produce a unitary merged image forming said stereoscopic image for display, said unitary merged image timed according to said display timing information to permit said unitary merged image to be displayed on a display unit.

3. A computer-readable storage medium having a program stored thereon for performing a graphic processing method, said method comprising:

obtaining a first image and display timing information of said first image via a first channel, said first image being a moving image shot by an external unit, said first channel being selected from the group consisting of a) a broadcast channel carrying a broadcast signal of a broadcast station; b) a cable communication channel carrying a cable signal of said broadcast station transmitted via a cable; and c) a recorded source of information recorded on a portable storage medium;

obtaining a second image via a second channel, said second image including a computer generated (CG) object capable of being displayed in a form conveying motion, said second channel being selected from the group consisting of said broadcast channel, said cable communication channel and said recorded information source, said second channel being different from said first channel;

combining said first image with said second image to produce a unitary merged image timed according to said display timing information, such that the motion of the object and an appearance of the object are synchronized with a motion of said first image in accordance with said display timing information, and the motion of the object and the appearance of the object change in accordance with an execution procedure of a predetermined graphic processing program; and outputting said unitary merged image in a form permitting said unitary merged image to be displayed on a display unit.

4. The computer-readable storage medium according to claim 3, wherein said method further comprises obtaining additional information indicative of a condition of a shooting site at which said first image is shot in synchronization with said display timing information, and said first and said second images are combined such that the motion and the appearance of the object change in accordance with said additional information.

5. The computer-readable storage medium according to claim 4, wherein said additional information includes relative position information indicating an apparent location of at least one of a character and the object in relation to said moving image, and said first and said second images are combined such that a direction and a display position of said at least one of the object and the character change in accordance with said relative position information.

6. The computer-readable storage medium according to claim 4, wherein said additional information further includes meteorological condition information of said shooting site, and said first and second images are combined such that the motion and the appearance of the object change in accordance with said meteorological condition information.

7. The computer-readable storage medium according to claim 4, wherein said method further comprises receiving operation information from a predetermined controller operated by an operator, and said first and said second images are combined such that the motion and the appearance of the object change in accordance with said received operation information.

8. A graphic processing method, comprising:

obtaining a first image and display timing information of said first image via a first channel, said first image being a moving image obtained by reducing resolution of a high-resolution moving image to correspond to said first channel, said first channel being selected from the group consisting of a) a broadcast channel carrying a broadcast signal of a broadcast station; b) a cable communication channel carrying a cable signal of said broadcast station transmitted via a cable; and c) a recorded source of information recorded on a portable storage medium;

obtaining a second image via a second channel, said second image including differential information representing a difference between said high-resolution moving image and said first image, said second channel being selected from the group consisting of said broadcast channel, said cable communication channel and said recorded information source, said second channel being different from said first channel;

combining said first image with said second image to produce a unitary merged image timed according to said display timing information and having the same resolution as that of said high-resolution moving image; and outputting said unitary merged image in a form permitting said unitary merged image to be displayed on a display unit.

* * * * *

UNITED STATES PATENT AND TRADEMARK OFFICE
CERTIFICATE OF CORRECTION

PATENT NO. : 6,924,846 B2
DATED : August 2, 2005
INVENTOR(S) : Akio Ohba

It is certified that error appears in the above-identified patent and that said Letters Patent is hereby corrected as shown below:

Column 5,
Line 28, "a" should read -- α --.

Column 10,
Line 41, "hose" should read -- whose --.

Signed and Sealed this

Twenty-fifth Day of October, 2005

JON W. DUDAS
*Director of the United States Patent and Trademark Office*